C. F. Bauersfeld,
Wood Molding Machine.
Nº 12,580.      Patented Mar. 27, 1855.
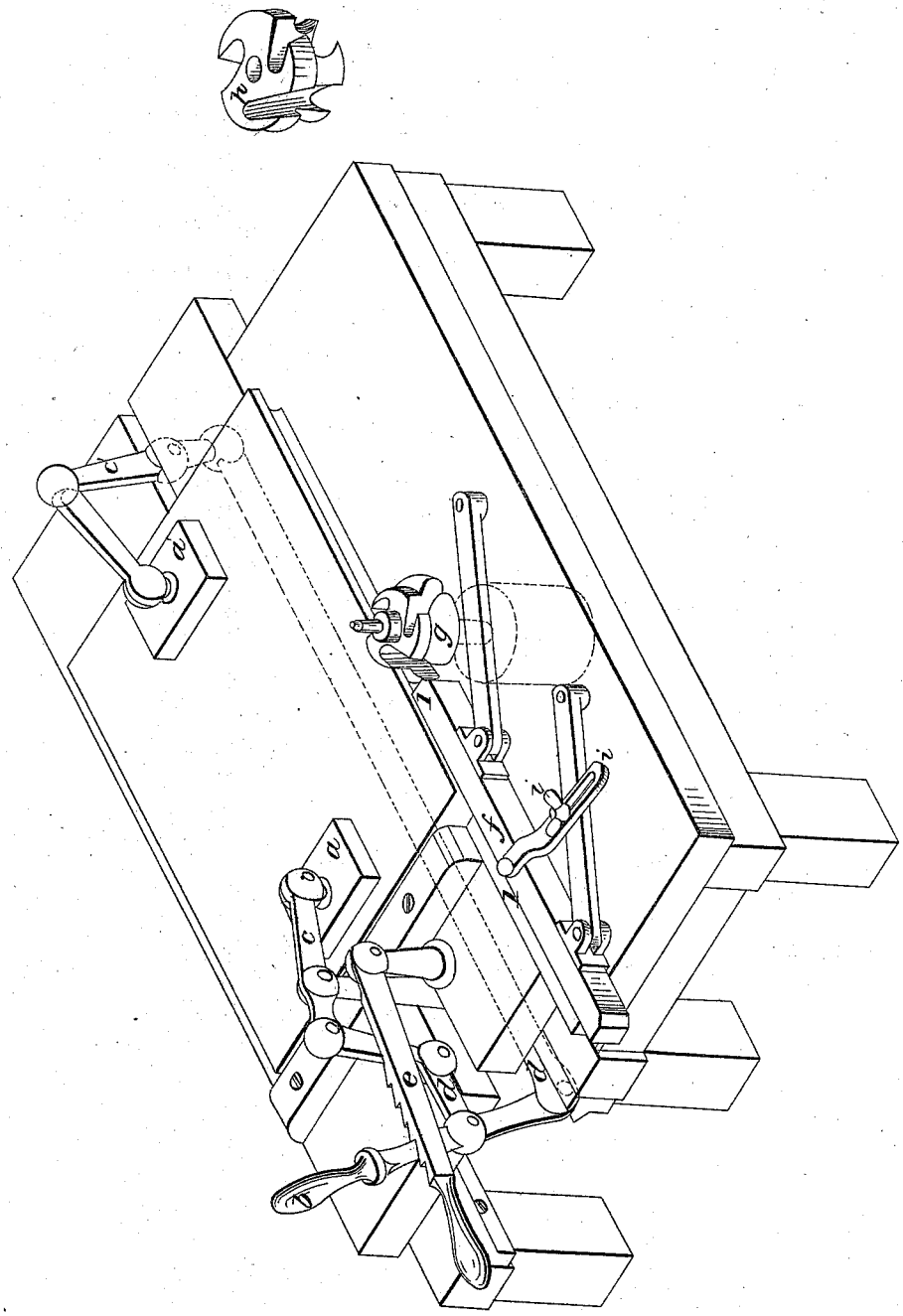

UNITED STATES PATENT OFFICE.

CHARLES F. BAUERSFELD, OF CINCINNATI, OHIO.

CLAMP AND MOUTHPIECE FOR LUMBER-JOINTING MACHINES.

Specification of Letters Patent No. 12,580, dated March 27, 1855.

*To all whom it may concern:*

Be it known that I, CHARLES F. BAUERSFELD, of Cincinnati, Hamilton county, Ohio, have invented a new and useful Machine for Dressing and Matching the Joints of Table-Leaves and other Articles of Furniture; and I do hereby declare the following to be a full, clear, and exact description thereof, reference being had to the annexed drawings, making part of this specification.

The fact that leaves of tables and other articles of furniture are now jointed by hand labor would seem to indicate that some appliances are wanting to extend to this extensive branch of manufacture the facilities of steam and power and thus place it on the same or on equal footing with manufactures of flooring and other works in wood. The continuous feed motion however of flooring machinery is not applicable to furniture the nice and accurate fitting of the parts which come together, and the variety in the form of the joints requiring a different mode of presentation of the work to the cutting tool—and as most of the pieces have to be jointed all around a dog or other pointed clamp for grasping the edges is inadmissible. A single clamp bearing against the flat portion could not be adapted to hold with sufficient steadiness the many forms of pieces employed in the construction of furniture. Some pieces particularly from their branching and complicated form require to be held in many places at once. It therefore becomes necessary to have two or more clamps which are so connected to each other as (however numerous) to be withdrawn or applied simultaneously to such parts of the piece as may be of most service.

For the purpose of illustration, the simplest form of the invention is here presented, being a pair of clamps (*a*) (*a'*) connected to the same handle (*b*) by means of suitable levers (*c*) (*c'*) and links (*d*) (*d'*) so arranged and proportioned as that a given motion of the handle shall act simultaneously and equally on each clamp. For pieces of complicated form or pattern—three four or more clamps or any necessary number may be easily connected on the same principle, so as to be all simultaneously lifted off or brought to bear upon the board. A notched arm (*e*) may be employed to hold the handle, so as to secure the clamps to their places.

(*f*) Is a gage or rest forming at its front edge (1), a mouth piece for the rotating cutter (*g*) or (*h*). This gage is by means of a pair of parallel arms held in a longitudinal or other desired direction, whether moved toward or from the stuff. Its position, being adjusted to suit the particular cutter and work is fixed by means of a bridle *i* and hand screw (*j*) as represented.

I claim as new and of my invention—

1. Two or more clamps, so arranged and connected as described as to be simultaneously and equally applied to or withdrawn from the different parts of a portion of furniture to be jointed; by the means of a single handle.

2. The parallel motion fixed in any desired position by means of the bridle and screw as described.

In testimony whereof, I hereunto set my hand before two subscribing witnesses.

CHARLES F. BAUERSFELD.

Witnesses:
GEO. H. KNIGHT,
THOS. W. SCOTT.